Nov. 1, 1938.  W. L. WOLFORD  2,135,158
MEANS FOR MAINTAINING THE FLUID LEVEL OF STORAGE BATTERIES
Filed Sept. 18, 1936
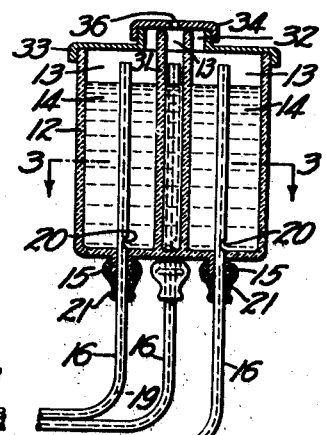
FIG.1
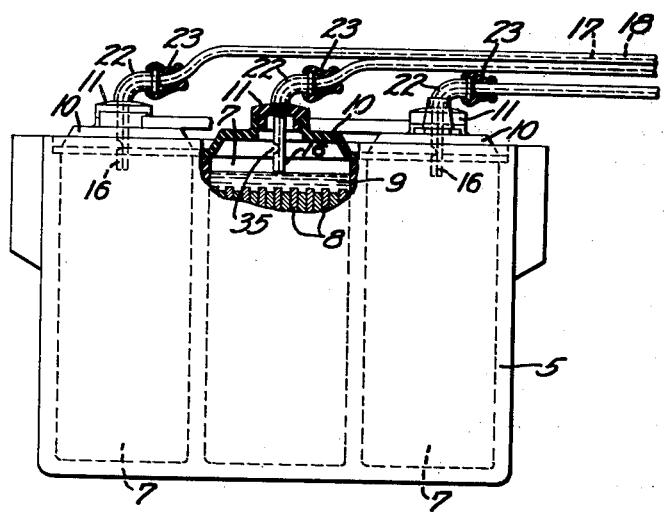
FIG.4
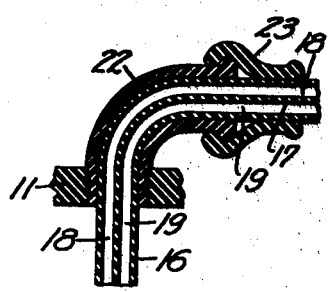
FIG.2
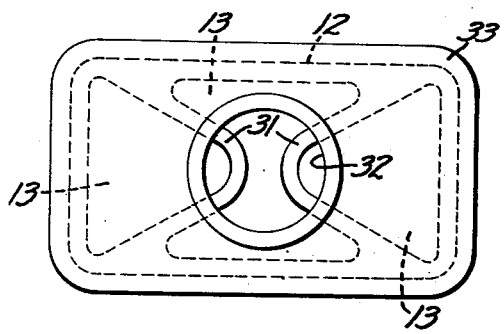
FIG.3
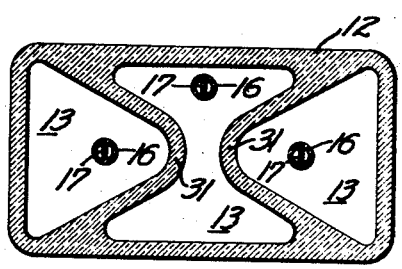
INVENTOR
Walter L. Wolford
BY
Harry G. Sehwede
ATTORNEY Patented Nov. 1, 1938

2,135,158

UNITED STATES PATENT OFFICE 2,135,158

MEANS FOR MAINTAINING THE FLUID LEVEL OF STORAGE BATTERIES

Walter L. Wolford, Oakland, Calif.

Application September 18, 1936, Serial No. 101,481

2 Claims. (Cl. 137—21)

This invention relates to devices by means of which the fluid in a container may be maintained at a constant level.

It is an object of the invention to provide a device of the character described which will automatically replenish the fluid, of the individual cells of a storage battery, lost through evaporation.

It is another object of the invention to provide a device which, in preventing the fluid in the several cells of a battery from falling to such a level as to uncover the surfaces of the plates, will prevent injury to the plates and materially extend the useful life of the battery.

A further object of the invention is to provide a novel fluid reservoir comprising a plurality of separate compartments which may be simultaneously filled and which will automatically feed fluid to the battery cells to replenish that removed therefrom by evaporation.

The invention possesses other objects and valuable features, some of which, together with the foregoing, will be specifically set forth in the specification hereunto annexed. It is to be understood that the invention is not to be limited to the particular form thereof shown and described as various other embodiments thereof may be employed within the scope of the appended claims.

Referring to the drawing:

Figure 1 is a front elevational view showing the apparatus of my invention attached to a storage battery. Portions of the battery are broken away so as to more clearly disclose the internal construction, and the fluid reservoir is shown in section.

Figure 2 is a top plan view of the fluid reservoir with the closure cap of the filling aperture removed.

Figure 3 is a cross sectional view of the fluid reservoir. The plane in which the view is taken is indicated by the line 3—3 of Figure 1.

Figure 4 is a vertical sectional view, to an enlarged scale, showing the construction of one of the connectors which attach the feed conduits to the battery.

In detail, the invention is adapted for use with any fluid-electrolyte storage battery 5 having individual cells 7 containing plates 8 and fluid electrolyte 9. Each cell is provided with the usual cover 10 having therein the usual removable service cap through which water may be added to the electrolyte and the interior of the battery may be inspected, and an additional removable cap 11.

My invention contemplates providing a reservoir 12, preferably composed of glass or other transparent material, having three separate compartments 13, adapted to contain quantities of distilled water 14, and each of the compartments is provided at its bottom with an aperture surrounded by a hub 15. Through each of these apertures passes a rubber tube 16 having a central partition 17 which divides the tube into separate ducts 18 and 19. The tube, as is shown in Figure 1 extends upwardly beyond the level of the fluid 14 and the duct 19, is in communication with the chambers below the water level thereof through an aperture 20. To maintain a fluid-tight connection between the reservoir and the tubes 16, each tube is fitted with a rubber sleeve 21 which tightly engages the surfaces of the tube and the hub 15. It is obvious that the ducts 18 and 19 may be provided by dispensing with the partition 17 and placing an additional tube within the tube 16 thus providing two concentric passages.

The lower end of each tube, as is best shown in Figure 4, passes through the bore of a hard rubber connector elbow 22 and a rubber sleeve 23 is provided here between the beaded outer end of the elbow and tube for maintaining a fluid-tight joint. The opposite end of the elbow is externally threaded to engage a threaded aperture formed in the cap 11, or, if desired, the elbow may be threaded directly into the cell cover 10. The lower end of each duct 19 of the tubes 16, it will be noted in Figure 1, terminates at the normal level of the electrolyte 9 in each cell.

The partitions 31, which divide the reservoir into the several chambers 13, are shaped so that their central portions approach closely adjacent each other and extend upwardly into the aperture 32 of the reservoir cover, and the aperture is made of such size that a considerable part of each chamber is exposed therethrough. It will be obvious that in filling the chambers with water, from a container, through the aperture 32 the stream of water may be directed into any of the chambers. The portions of the partitions which extend upwardly into the filling opening are provided so that the throats of the several divisions of the openings will be flush with the top of the flange of the aperture 32 thus permitting the stream of water from a bottle or other container to be readily directed into any one of the chambers 13 without any diversion of portions of the stream which would possibly occur if the partitions terminated a considerable distance below the top of the flange. To provide a seal for the chambers 13, a closure cap 34 is provided for the filling aperture 32.

In actual use the reservoir 12 is permanently fixed, preferably in the motor compartment of a vehicle, or in any other portion thereof where it may be readily inspected, in such a position that fluid from the chambers thereof may flow by gravity into the battery cells. It will be seen that since the lower end of ducts 18 and 19 of each tube 16 is sealed by the electrolyte in the battery no water may flow through the aperture 20 and the ducts 19 into the cell. However, as soon as sufficient fluid has evaporated from the cell, the end of the duct 19 will be uncovered whereupon the seal will be broken and air will rise from the cell through the duct into the chamber 13 thereby permitting water to flow from the chamber which, of course, flows downwardly through the duct 19 into the cell until the level of the fluid in the cells rise to close the end of the duct 19, whereupon the flow of water from the chamber will cease.

The tubes 16 are made of rubber, in preference to metal, to insure that no harmful oxides will be carried into the battery cells by the incoming water from the reservoir, which would possibly occur if the tubes were made of iron or copper alloys.

The multi-unit reservoir construction, and the separate conduits from each water storage compartment to the individual cells of the battery are provided chiefly for the purpose of providing thorough insulation of the cells and chambers from each other thereby eliminating current losses and short circuits through the reserve water. The device just described, when the reservoir is filled with water, is capable of automatically maintaining the fluid level of a storage battery constant, thereby obviating the necessity of frequent inspections of the battery to insure that the fluid is at a safe level. Since the reservoir is capable of holding a material quantity of water it will maintain the level of the battery electrolyte over a considerable period of time before refilling of the reservoir is necessary.

In addition to the above features, the reservoir provides means for checking the mechanical condition of the battery, since if an abnormal quantity of water, as indicated by the fluid level in the reservoir, is consumed by a certain cell, this is indicative that that particular cell is overheating or leaking and should be checked by a battery expert. This will often result in forestalling a possible failure of the battery at a crucial time and the saving of considerable expense attendant thereon, or in the replacement of a ruined battery.

I claim:

1. In apparatus for maintaining the level of fluid electrolyte in storage batteries having individual cells, a unitary transparent fluid reservoir having partitions therein dividing said reservoir into a plurality of separate compartments, each of said compartments having therein an aperture, conduits passing through the respective apertures, a cover for said reservoir having a central opening therein, and each of said partitions having a portion rising therefrom and entering said cover opening in such manner as to divide said opening into a plurality of lesser openings, each communicating with a separate reservoir compartment.

2. In apparatus for maintaining the level of fluid electrolyte in storage batteries having individual cells, a unitary transparent fluid reservoir having partitions therein dividing said reservoir into a plurality of separate compartments, each of said compartments having therein an aperture, conduits passing through the respective apertures, a cover for said reservoir having a central opening therein surrounded by an upstanding peripheral flange, and each of said partitions having a portion rising therefrom and entering and extending through said cover opening into the space surrounded by said flange in such manner as to divide said opening into a plurality of lesser openings each communicating with a separate reservoir compartment.

WALTER L. WOLFORD.